United States Patent [19]

Wolf et al.

[11] Patent Number: 4,749,280

[45] Date of Patent: Jun. 7, 1988

[54] ARRANGEMENT FOR MEASURING THE TEMPERATURE IN A HEATING SYSTEM COMPRISING A HOT PLATE AND A COOKING POT

[75] Inventors: Kurt Wolf; Wolfram K. Andre, both of Wildbad, Fed. Rep. of Germany

[73] Assignee: Kurt Wolf & Co. KG, Fed. Rep. of Germany

[21] Appl. No.: 920,568

[22] Filed: Oct. 17, 1986

[30] Foreign Application Priority Data

Oct. 29, 1985 [DE] Fed. Rep. of Germany ....... 3538353

[51] Int. Cl.$^4$ .......................... G01J 5/28; G01K 13/00
[52] U.S. Cl. ...................................... 374/130; 219/449; 219/502; 250/353; 374/121
[58] Field of Search ............... 219/449, 441, 442, 448, 219/502; 374/6, 10, 121, 124, 141, 130; 356/43; 250/353

[56] References Cited

U.S. PATENT DOCUMENTS

| | | | |
|---|---|---|---|
| 4,020,695 | 5/1977 | Roney | 356/43 |
| 4,582,426 | 5/1986 | Douglas | 374/121 |
| 4,614,441 | 9/1986 | Wolf | 374/121 |

Primary Examiner—A. D. Pellinen
Assistant Examiner—Leon K. Fuller
Attorney, Agent, or Firm—Thomas W. Speckman; Ann W. Speckman

[57] ABSTRACT

An apparatus for measuring the temperature in a heating system comprising a cooking pot with cooking material positioned on a hot plate where a radiation receiver is arranged at a distance from the wall of the cooking pot and aligned with it, which receiver produces a temperature measurement signal corresponding to the temperature of the cooking material in the cooking pot. The temperature measurement signal is derived from a detected radiation area on the wall of the cooking pot which corresponds to the radiation measuring field of the radiation receiver. The effect of different distances of the cooking pot from the radiation receiver is automatically compensated for by aligning the center axis of the radiation measurement field at an acute angle to the support surface of the hot plate, so that the distance of the center of the detected radiation area from the bottom of the cooking pot increases with an increasing distance of the wall of the cooking pot from the radiation receiver.

13 Claims, 1 Drawing Sheet

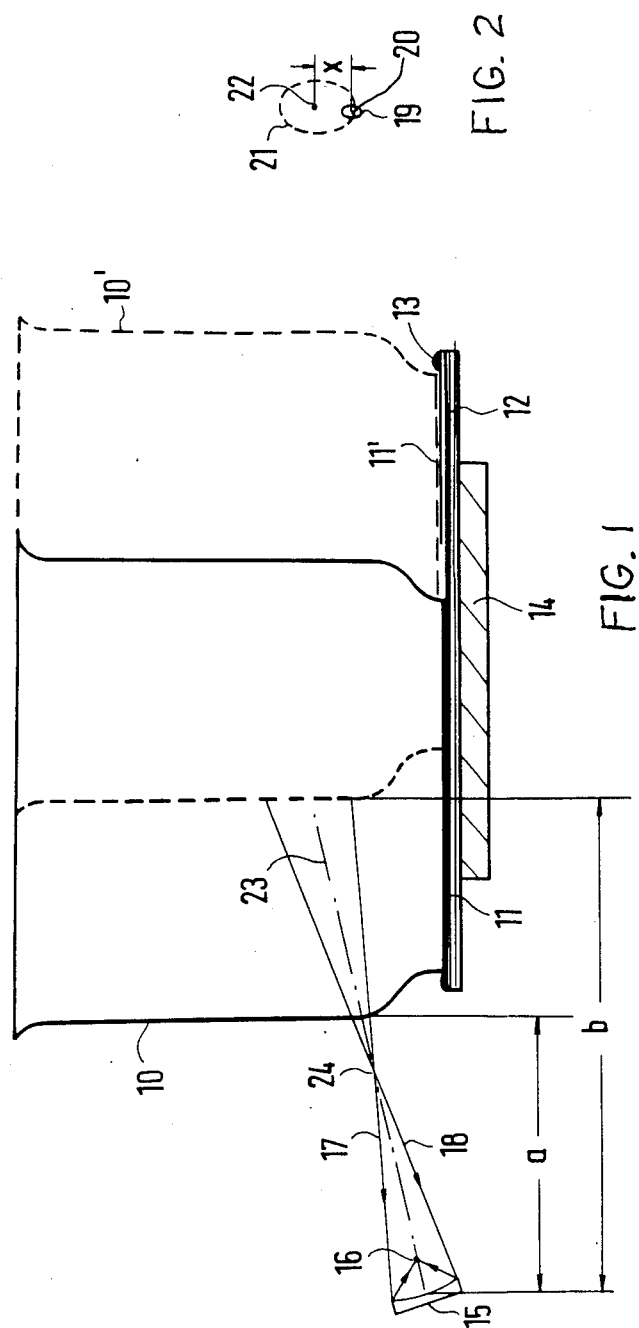

ARRANGEMENT FOR MEASURING THE TEMPERATURE IN A HEATING SYSTEM COMPRISING A HOT PLATE AND A COOKING POT

BACKGROUND OF THE INVENTION

1. Field of the Invention

This invention relates to an arrangement for measuring the temperature in a heating system comprising a cooking pot with cooking material placed on a hot plate and heated, where a radiation receiver is provided at a distance from the wall of the cooking pot and is aligned with it, the receiver producing a temperature measurement signal dependent upon the temperature of the cooking material in the cooking pot and corresponding to a detected radiation area on the cooking pot within the radiation measuring field of the radiation receiver.

2. Description of the Prior Art

A similar arrangement is taught in German patent DE-PS No. 33 41 234. Here, the cooking pot is equipped with an annular radiation area close to the bottom of the cooking pot, and the center axis of the radiation receiver is directed in such a way that this axis is horizontal and runs parallel to the support area of the heating plate.

It has been shown that during the heating phase the measuring accuracy of this arrangement is impaired by the fact that the cooking pot may be placed at different positions on the hot plate. If the cooking pot is located at a short distance from the radiation receiver, heating of the detected radiation area which is further removed from the center of the heating plate is delayed. However, if the cooking pot is located at a large distance from the radiation receiver, heating of the detected radiation area is accelerated since it is located closer to the center of the hot plate.

SUMMARY OF THE INVENTION

It is an object of the present invention to provide an arrangement of the type described above, where the dynamic effect of the differing distances between the radiation receiver and the pot wall of the cooking pot placed on the hot plate is compensated for automatically in the heating phase so that sufficient measuring accuracy is achieved independent of the position of the cooking pot on the hot plate.

The invention achieves this object by aligning the center axis of the radiation measurement field at an acute angle to the support surface of the hot plate, so that the distance of the center point of the detected radiation area from the bottom of the cooking pot increases as the distance of the wall of the cooking pot from the radiation receiver increases.

This alignment of the radiation receiver provides that with an increasing distance of the cooking pot from the radiation receiver, the center point of the detected radiation area is moved higher with respect to the bottom of the cooking pot. With a decreasing distance of the cooking pot from the radiation receiver, the center point of the detected radiation area is shifted toward the pot bottom. As a consequence, the heating delay occurring at the detected radiation area during the heating phase is compensated for by superimposing the detected radiation area on a field which is closer to the hot plate. If the cooking pot is moved away from the radiation receiver and closer to the center of the hot plate, the acceleration of the temperature measurement during the heating phase which would occur with a horizontally aligned radiation receiver is eliminated by aligning the radiation receiver to provide the detected radiation area in cooler regions further away from the hot plate. Thus, this makes it possible to automatically compensate for temperature measurement inaccuracies resulting from moving the cooking pot on the hot plate during the heating phase.

One embodiment provides limited movement of the cooking pot on the hot plate between a minimum and a maximum distance from the radiation receiver by providing a rim on the hot plate.

One embodiment is characterized in that the center axis of the radiation measurement field of the radiation receiver is provided at an angle of less than 10° to the plane of the hot plate.

Another embodiment provides a radiation receiver with a concave mirror at the input point which combines input from the whole radiation measurement field between the two boundary rays of the radiation receiver, which simplifies alignment of the radiation measurement field of the radiation receiver. To provide automatic compensation for the temperature measurement error in this case, the boundary rays of the radiation measurement field of the radiation receiver intersect at a point whose distance from the radiation receiver is less than the minimum distance of the wall of the cooking pot from the focusing lens of the radiation receiver.

According to one embodiment, measurable signals of sufficient magnitude may be obtained when the outer side of the cooking pot wall at least in the area of the maximum detected radiation area provides good heat radiation, and preferably has a constant emission factor across the whole area.

A simple adjustment feature may be provided by having the radiation receiver tiltable and adjustable in such a way that the angle of the center axis of the radiation measurement field can be changed in relationship to the support surface of the hot plate.

According to another embodiment, accurate temperature measurements independent of the position of the cooking pot on the hot plate may also be achieved by configuring the radiation area on the cooking pot as an ellipse, with minimum vertical height of approximately 10 mm from the outside of the pot bottom and a minimum radius of approximately 10 mm.

BRIEF DESCRIPTION OF THE DRAWING

The invention will be explained further by means of the schematic drawings, in which:

FIG. 1 shows a cooking pot at two positions on a hot plate with a radiation receiver and its corresponding radiation measurement fields; and FIG. 2 shows the detected radiation areas corresponding to the two positions of the cooking pot shown in FIG. 1.

DESCRIPTION OF PREFERRED EMBODIMENTS

As shown in FIG. 1, hot plate 12 is heated by means of electric heating element 14 and is confined by a circular elevated rim 13. Thus, cooking pot 10 may be placed at different positions on hot plate 12 as shown by the two extreme positions designated as cooking pots 10 and 10'. As shown, the walls of cooking pots 10 and 10' placed on hot plate 12 are at a minimum distance (a) and a maximum distance (b), respectively, from concave mirror 15 of radiation receiver 16. The distance between the cooking pot and radiation receiver 16 is determined by shifting cooking pots 10 and 10' in the direction toward or away from radiation receiver 16.

Radiation receiver 16 is aligned with the wall of cooking pots 10 and 10' in such a way that center axis 23 of the radiation measurement field which determines the detected radiation area on the cooking pot between boundary rays 17 and 18, is aligned at an acute angle of approximately 5° to 10° to the horizontal support surface of hot plate 12. The radiation measurement field is concentrated at radiation receiver 16 by concave mirror 15 and is transformed into an electrical signal by a converter as is known in the art, the size of the electrical signal depending on the size of the radiation area detected, the temperature of the radiation area, and the distance between cooking pot and radiation receiver.

As shown in FIG. 2, when the wall of cooking pot 10 is at minimum distance (a) from concave mirror 15 of radiation receiver 16, the detected radiation area 19 is small, while a considerably larger radiation area 21 is detected when the wall of cooking pot 10' is at maximum distance (b) from concave mirror (15) of radiation receiver 16.

As FIG. 1 shows, a cooking pot can be moved on hot plate 12 between the positions shown at 10 and 10', with the distance between the pot wall and concave mirror (15) of radiation receiver 16 changing from (a) to (b). The distance (a) or (b) between radiation receiver 16 and the pot wall of cooking pot 10 or 10' is measured at concave mirror 15. FIG. 2 shows the position of center points 20 and 22 of detected radiation areas 19 and 21, respectively, corresponding to minimum distance (a) and maximum distance (b), respectively. This demonstrates that proceeding from a centered position of the cooking pot on the electric heating element, with decreasing distance from the radiation receiver, the center of the detected radiation area is shifted toward the pot bottom, i.e., toward hotter areas of the cooking pot. Since the distance of the detected radiation area on the cooking pot from a center point of hot plate 12 increases when the distance of the detected radiation area from radiation receiver 16 decreases, the temperature measurement derived from the detected radiation area during the heating phase is distorted accordingly, since the detected radiation area is heated more slowly than other parts of the cooking pot and will have the temperature prevailing in the cooking pot at a later time point. By shifting detected radiation area 19 toward the pot bottom due to the oblique angle of center axis 23 of the radiation measurement field, this distortion is automatically compensated for in the temperature measurement so that the temperature measured corresponds precisely to the temperature in the cooking pot.

A similar situation exists when the cooking pot is moved in such a way that its distance from radiation receiver 16 is increased. In this case, detected radiation area 21 is positioned closer to the hot plate 12 which results in an acceleration of the temperature rise at the wall of the cooking pot and, without any compensation, the detected radiation area will give a temperature measurement signal reflecting a temperature which has not yet been reached in the rest of the cooking pot. To compensate for this measurement distortion, center point 22 of detected radiation area 21 is adjusted away from the pot bottom to a cooler area of the pot wall. In this manner, the distortion in the temperature measurement is compensated for and the correct temperature is again indicated. The oblique position of center axis 23 at an angle of less than about 10° to the plane of the hot plate provides automatic compensation for the dynamic effect of the distance of concave mirror 15 of radiation receiver 16 from detected radiation area 19 or 21 independent of the position of the cpoking pot on hot plate 12, by shifting the detected radiation area in relationship to the bottom of cooking pot 10 and hot plate 12.

With the angle of center axis 23 of the radiation measurement field established, the magnitude of shift (x) of center points 20 and 22 of the smallest and largest detected radiation areas 19 and 21, respectively, may be determined and the amount of compensation may thus be established.

According to one embodiment, if the radiation measurement field is provided so that intersecting point 24 of boundary rays 17 and 18 is closer to radiation receiver 16 than is the wall of cooking pot 10 at minimum distance (a), then shift (x) corresponding to the distance between the center points of the detected radiation areas, is proportional to the distances (a) and (b) of the wall of the cooking pot on hot plate 12 from concave mirror 15 of radiation receiver 16. This relationship facilitates the adjustment of the radiation measurement field and allows a simple alignment of the radiation receiver.

We claim:

1. An apparatus for measuring the temperature in a heating system comprising a cooking pot with cooking material positioned on a hot plate; a radiation receiver having a radiation measurement field provided at a distance from the wall of said cooking pot and aligned to detect a radiation area on the wall of said cooking pot, said radiation receiver deriving a temperature measurement signal corresponding to the temperature of said cooking material in said cooking pot from said detected radiation area on said pot wall, characterized in that: said radiation measurement field has a center axis (23) aligned at an acute angle to the plane of said hot plate (12) whereby the distance of a center point (20, 22) of said detected radiation area (19, 21), from the bottom (11) of said cooking pot (10) increases as the distance of said wall of said cooking pot (10) from said radiation receiver (16) increases.

2. Apparatus as set forth in claim 1, characterized in that the position of said cooking pot (10) on said hot plate (12) is adjustable and is limited by a support rim (13) extending around the periphery of said hot plate (12), said support rim (13) providing placement of said cooking pot at a minimum distance (a) and a maximum distance (b) from said radiation receiver (16).

3. Apparatus as set forth in claim 2, characterized in that said center axis (23) of said radiation measurement field of said radiation receiver (16) is aligned at an angle of less than about 10° to the plane of said hot plate (12).

4. Apparatus as set forth in claim 3, characterized in that said radiation receiver (16) has a concave mirror (15) at its input point which defines said radiation measurement field having said center axis 23 and located between two boundary rays (17, 18).

5. Apparatus as set forth in claim 4, characterized in that said boundary rays (17, 18) defining said radiation measurement field of said radiation receiver (16) intersect at a point (24), and the distance of said intersection point (24) from said radiation receiver (16) is less than said minimum distance (a) between the wall of said cooking pot (10) and said radiation receiver (16).

6. Apparatus as set forth in claim 5, characterized in that the wall of said cooking pot (10) has a constant emission factor providing accurate heat radiation at least in the area of said maximum detected radiation area (21).

7. Apparatus as set forth in claim 6, characterized in that said radiation receiver (16) is tiltable and adjustable so that the angle of said center axis (23) of said radiation measurement field is adjustable with respect to the plane of said hot plate (12).

8. Apparatus as set forth in claim 7, characterized in that said detected radiation area on said cooking pot (10) is an ellipse having minimum vertical distance from the pot bottom of about 10 mm and a minimum radius of about 10 mm.

9. Apparatus as set forth in claim 1, characterized in that said center axis (23) of said radiation measurement field of said radiation receiver (16) is aligned at an angle of less than about 10° to the plane of said hot plate (12).

10. Apparatus as set forth in claim 1, characterized in that said radiation receiver (16) has a concave mirror (15) at its input point which defines said radiation measurement field having said center axis 23 and located between two boundary rays (17, 18).

11. Apparatus as set forth in claim 1, characterized in that the wall of said cooking pot (10) has a constant emission factor providing accurate heat radiation at least in the area of said maximum detected radiation area (21).

12. Apparatus as set forth in claim 1, characterized in that said radiation receiver (16) is tiltable and adjustable so that the angle of said center axis (23) of said radiation measurement field is adjustable with respect to the plane of said hot plate (12).

13. Apparatus as set forth in claim 1, characterized in that said detected radiation area on said cooking pot (10) is an ellipse having minimum vertical distance from the pot bottom of about 10 mm and a minimum radius of about 10 mm.

* * * * *